March 16, 1965  G. E. HORNSBY  3,173,670
BRACKET FOR COMBINED SHOCK ABSORBER AND WHEEL MOUNT
Filed Dec. 18, 1962
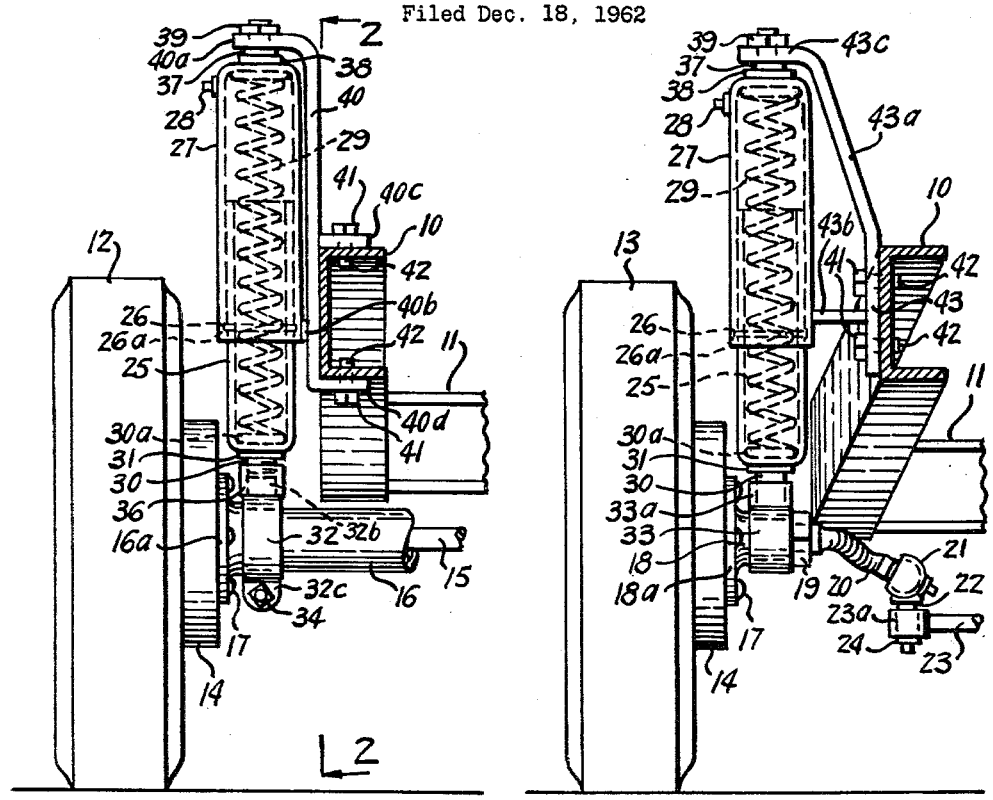
FIG. 1
FIG. 3
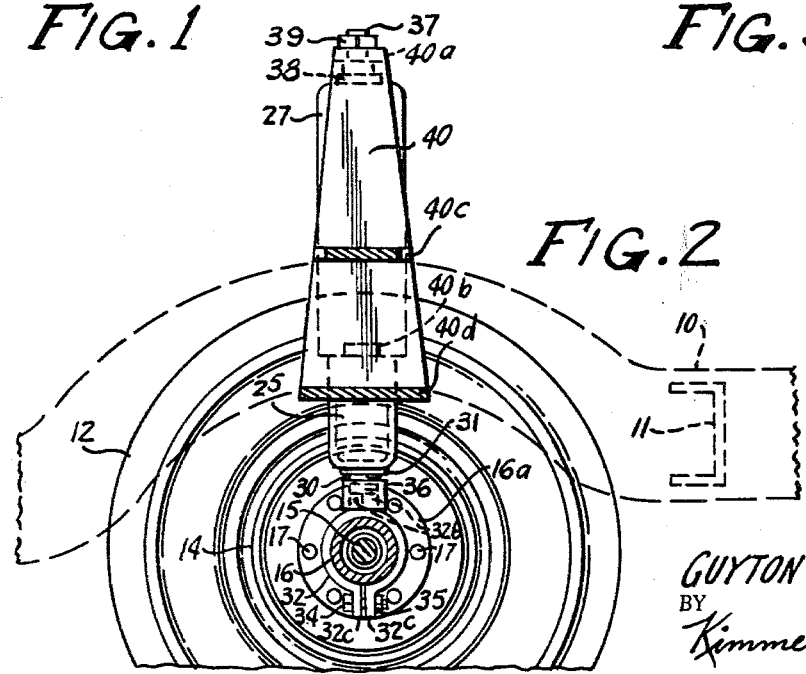
FIG. 2
INVENTOR.
GUYTON E. HORNSBY
BY
Kimmel & Crowell
ATTORNEYS.

United States Patent Office 3,173,670
Patented Mar. 16, 1965

3,173,670
BRACKET FOR COMBINED SHOCK ABSORBER
AND WHEEL MOUNT
Guyton Ellis Hornsby, Annandale, Va.
(P.O. Box 369, Washington 4, D.C.)
Filed Dec. 18, 1962, Ser. No. 245,557
3 Claims. (Cl. 267—60)

This invention relates to a combined shock absorber, spring substitute and wheel mount for motor vehicles.

The object of the present invention is to provide a combined shock absorber and wheel mount which is adapted for use on present day motor vehicles with a minimum of modification of the frame and axle housings of the latter.

Another object of the present invention is to provide a combined shock absorber and wheel mount which is particularly adaptable to the low slung chassis of modern passenger motor vehicles.

An additional object of the present invention is to provide a combined shock absorber and wheel mount which can be readily installed on the chassis of present day motor vehicles and also readily removed from same for repair or replacement.

A further object of the present invention is to provide a combined shock absorber and wheel mount in which the units on the frame axle also function as king pins in the steering mechanism.

Still other objects, advantages and improvements will become apparent from the following specification, taken in connection with the acompanying drawing, in which:

FIGURE 1 is a rear elevational view showing the combined shock absorber and wheel mount according to the present invention between the chassis and the rear axle of the motor vehicle;

FIGURE 2 is a longitudinal vertical sectional view, taken on the section line 2—2 of FIG. 1 and looking in the direction of the arrows; and FIGURE 3 is a front elevational view showing the combined shock absorber and wheel mount according to the present invention between the chassis and the spindle housing of one front wheel of a motor vehicle.

Referring now to the drawings in detail and to FIGURE 1 in particular, the reference numeral 10 here designates one of the longitudinally extending members of the chassis or frame of a motor vehicle and the reference numeral 11 a transversely extending member of same. One rear wheel of the motor vehicle is shown at 12 and this wheel has on the inner face of the hub (not shown) a brake drum housing 14. The rear axle 15 is enclosed by a housing 16, which has a flange 16a at its outer end and this flange is secured to the brake drum housing 14 by rivets 17, as shown in FIGURE 2.

The combined shock absorber and wheel mount according to the present invention is comprised by a lower cylinder 25 and an upper cylinder 27, which latter telescopically receives the lower cylinder. The slideable mounting between the lower cylinder 25 and the upper cylinder 27 provides a fluid tight relationship between the two, this being facilitated by a toroidal gasket 26, which is received in a circumferential groove in the inner wall of the upper cylinder 27 and encompasses the lower cylinder 25. The shock absorber may be either of the air cushion or the liquid filled type, the liquid preferably being oil. At the top of the upper cylinder 27 there is a relief valve 28. This valve admits air to the interiors of the cylinders 25 and 27 on the down stroke, as the rear axle housing 16 moves away from the transversely positioned chassis member 11, for replacing any air or oil, that may have escaped past the gasket 26 on the up stroke, when the rear axle housing 16 moves toward the transversely positioned chassis member 11. Within the cylinders 25 and 27 there is a coiled compression spring 29 of quite large modular of elasticity which abuts the bottom of the lower cylinder 25 and the top of the upper cylinder 27. This spring replaces the usual cantilever springs which are part of the chassis mounting on a motor vehicle.

A collar 32 is mounted around the rear axle housing 16. For the rear axle this collar is made in two complementary halves. Along their diametrical planes and at one end of the latter, the halves of the collar are formed with integral ears 32a—32a. A bolt 34 extends through aligned holes in the ears 32a—32a and has a nut 35 thereon for in part holding the collar in place on the rear axle housing 16. Also along their diametrical planes and at the other ends of the latter, the halves of the collar are formed with complementary semi-cylindrical bosses 32b—32b, which are internally threaded. A threaded rod 30 has a head formed as a disc 30a, which latter rest on the bottom of the lower cylinder 25 and this rod extends through a suitable hole (not shown) in the bottom of the cylinder. The coiled compression spring 29 abuts at its bottom the head 30a of this rod. A nut 31 is received on the rod 30 and abuts the bottom of the lower cylinder 25, to hold the rod in place. At its lower end the rod 30 is received in the complementary semi-cylindrical bosses 32b—32b on the collar. A sleeve 36 is form fitted over the semi-cylindrical bosses 32b—32b and serves to further hold the collar in place on the rear axle housing 16 and the rod 30 in place in the semi-cylindrical bosses.

Similarly, a threaded rod 37 has its head formed as a disc 37a, which latter abuts the top of the upper cylinder 27 and the rod extends through a suitable hole (not shown) in the top. The coiled compression spring 29 abuts at its top the head 37a of this rod. A nut 38 is received in the rod 30 and abuts the top of the cylinder 27 to hold the rod in place.

A bracket 40 has a top flange 40a, which is positioned on one side and at right angles to the main body section. This flange has a hole therein, by which it is received on the upper end of the threaded rod 37 and the flange abuts a shoulder (not shown) on the latter and is held in place by a nut 39. Adjacent its bottom the bracket 40 has a first arm 40b thereon, which is on the same side of the main body section as the upper flange 40a. This arm is secured to the side wall of the upper cylinder 27 in any suitable manner, as by welding. Above the arm 40b and on the opposite side of the main body section from the upper flange 40a and the arm, the bracket has a second arm 40c. At its bottom the bracket has a lower flange 40d, which is also on the opposite side of the main body section from the upper flange 40a and the first arm 40b and is parallel to the second arm 40c. The bracket is mounted on the longitudinally extending member 10 of the chassis with the latter received between the second arm 40c and the lower flange 40d on the brackets. It is held in place by bolts 41 having nuts 42 therein which bolts extend through aligned holes in the second arm 40c on the bracket and the upper flange of the longitudinally extending chassis member 10 and in the lower flange 40d on the bracket and the lower flange on the longitudinally extending member of the chassis.

The corresponding bracket for the shock absorber mounted on the front wheels 13 takes a different form, as is shown in FIGURE 3. This bracket is here designated by the reference 43. The different form of the bracket is required for the reason that the front wheels 13 turn during the steering of the vehicle in arcs of which the longitudinally extending side member 10 of the chassis are chords. The bracket is here comprised of a main body section 43, which is secured to the side of the longitudinally extending chassis member 10 by bolts 41 having nuts 42 thereon. As in the case of the bracket 40 of FIGURES 1 and 2, there is an integral arm 43b on the bracket which is likewise secured to the upper cylinder 27 as by welding. Above the main body section 43 the bracket is inclined upwardly and outwardly at 43a, and terminates in a top flange 43c which has a hole therein for receiving the threaded rod 38 in the top of the upper cylinder 27.

An arrangement that has been found to work very well on the low slung chassis of the present day motor vehicles is for the cylinders 25 and 27 to have a overall length of approximately two (2) feet and the brackets 40 and 43 to be of sufficient length to position the top of the upper cylinder 27 approximately six (6) inches above the top flange of the longitudinally extending chassis member 10.

The collar 33 for the front wheel mounting is shown in FIGURE 3 and is similar to the collar 32 for the rear wheel mounting, which is shown in FIGURES 1 and 2, but may be of one piece construction and have an uninterrupted boss 33a thereon. In the latter case the sleeve 36 would be unnecessary. This collar 33 is received on the housing 18 for the spindle (not shown) of the front wheel 13, the housing having a shoulder thereon (not shown) against which the collar abuts. At its outer end the spindle housing 18 has a flange 18a thereon by which it is secured to the brake drum 14 on the front wheel 13 in the same manner as the brake drum 14. The spindle housing 18 is screw threaded (not shown) at its inner end and a nut 19 is received on the screw threaded section. This nut holds the collar 33 against the shoulder on the spindle housing 18 and also provides for the attachment at one end of a steering knuckle 20 to the spindle (not shown) within the housing. The other end of the steering knuckle 20 is secured to the ball 20 of a universal joint 21. The socket of this universal joint is mounted on a stub shaft 22 which is received in a hole (not shown) in a boss 23a on the drag link 23 from the steering wheel (also not shown) and held in place by a pin 24.

The operation of the combined shock absorber and wheel mount according to the present invention should be readily apparent. The telescopically arranged cylinders 25 and 27 with the captive air, or oil, therein, between the chassis 10 and rear axle housing 16 or front spindle housing 18, function as shock absorbers. The coiled compression springs 29 which are positioned between the bottom of the lower cylinder 25, the latter being secured to the rear axle housing 16, or the front spindle housing 18, and the top of the upper cylinder 27, the latter being mounted on the longitudinally extending member 10 of the chassis, replace the usual cantilever springs on the chassis mounting. In the steering of the vehicle, the inner cylinder 25 rotates within the outer cylinder 27 in the manner of a king pin, as the spindles of the front wheels 13 swing through their arcs.

Having now fully described my invention, what I claim as new and useful and desire to secure by Letters Patent of the United States is:

1. A bracket, for mounting at an upper end vertically disposed shock absorber structure including a vertical axis and downwardly open upper cylinder,
   (1) said bracket including means to secure the lower portion thereof, at a plurality of vertically spaced apart locations, to a longitudinally extending vehicle frame channel member.
   (2) said bracket including a rigid vertical main body section,
   (3) a horizontal top flange bent away on one side of said main body section, means forming a vertical hole in said top flange for the reception of fixation means for the upper cylinder,
   (4) and a horizontally projecting first arm extending from the main body section on the same side of the main body section as said horizontal top flange,
   (5) said horizontally projecting arm being of sufficient length to contact a lower exterior portion of said vertical axis upper cylinder when the latter is fixed in assembled relationship with respect to said horizontal top flange,
   (6) The vertical placement of said first arm being between the vertically spaced apart means which secure the lower portion of the bracket to the channel member.
2. The structure of claim 1 wherein
   (1) the rigid vertical main body section of the bracket is bent, adjacent its lower channel secured portion, away from the vertical and slantingly upwardly and towards the same side of the body as the horizontally projecting first arm,
   (2) and the top flange is bent away from the slanting main body section until it is in a horizontal position,
   (3) and the means to secure the lower portion of the bracket to the channel member includes horizontal apertures suitable to receive screw fastening means.
3. The structure of claim 1 wherein said bracket also includes as means to secure the lower portion thereof to the channel member, at a plurality of vertically spaced apart locations,
   (1) a horizontal bottom flange bent away from the opposite side of said main body from said top flange, means forming a vertical hole in said bottom flange for the reception of lower fixation means between itself and the contiguous bottom of the frame channel member,
   (2) and a horizontally projecting second horizontal arm extending from the main body section on the same side of the main body section as said bottom flange, and directly above said bottom flange means forming a vertical hole in said second arm in substantial vertical axial alignment with the hole in said bottom flange for the reception of upper fixation means between itself and the contiguous top of the frame channel member,
   (3) the portion of said bracket between said bottom flange and said second horizontal arm abutting against the contiguous vertical web of said channel member.

References Cited by the Examiner

UNITED STATES PATENTS

| | | | |
|---|---|---|---|
| 986,904 | 3/11 | Burton | 267—60 |
| 1,178,692 | 4/16 | Trucano | 280—96.2 |
| 1,208,578 | 12/16 | Krause | 267—34 X |
| 1,265,677 | 5/18 | Knapp | 267—34 |
| 1,542,511 | 6/25 | Lancia | 280—96.2 |
| 1,614,699 | 1/27 | Swindowsky | 267—60 |
| 1,639,369 | 8/27 | Cormier | 267—34 |
| 2,018,653 | 10/35 | Best | 280—96.2 |
| 2,123,388 | 7/38 | Viguerie | 280—96.2 |
| 2,229,808 | 1/41 | Jennings | 267—28 |
| 2,866,651 | 12/58 | Powell | 267—20 X |
| 3,037,787 | 6/62 | Gottschald | 280—96.2 |
| 3,083,981 | 4/63 | Goyarts | 280—96.2 X |

A. HARRY LEVY, *Primary Examiner.*

LEO FRIAGLIA, *Examiner.*